(12) United States Patent
Yous et al.

(10) Patent No.: US 11,294,957 B2
(45) Date of Patent: Apr. 5, 2022

(54) VIDEO SEARCHING USING MULTIPLE QUERY TERMS

(71) Applicant: Carrier Corporation, Farmington, CT (US)

(72) Inventors: Sofiane Yous, Cork (IE); Keith J. Power, Cork (IE); Kishore K. Reddy, Meriden, CT (US); Alan Matthew Finn, Hebron, CT (US); Jaume Amores, Cork (IE); Zhen Jia, Shanghai (CN); Yanzhi Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 789 days.

(21) Appl. No.: 16/076,101

(22) PCT Filed: Feb. 1, 2017

(86) PCT No.: PCT/US2017/016006
§ 371 (c)(1),
(2) Date: Aug. 7, 2018

(87) PCT Pub. No.: WO2017/139151
PCT Pub. Date: Aug. 17, 2017

(65) Prior Publication Data
US 2021/0191978 A1     Jun. 24, 2021

Related U.S. Application Data

(60) Provisional application No. 62/293,942, filed on Feb. 11, 2016.

(51) Int. Cl.
*G06F 16/78*     (2019.01)
*G06F 16/783*    (2019.01)
(Continued)

(52) U.S. Cl.
CPC ...... *G06F 16/7837* (2019.01); *G06F 16/7335* (2019.01); *G06F 16/787* (2019.01); *G06K 9/00711* (2013.01); *H04N 21/4828* (2013.01)

(58) Field of Classification Search
CPC ............ G06F 16/7328; G06F 16/5854; G06F 16/7867; G06F 16/78; G06F 16/785; G06F 16/7857; G06F 16/786
(Continued)

(56) References Cited

U.S. PATENT DOCUMENTS 5,721,454 A * 2/1998 Palmer ................ H01L 23/3677
                                                     257/700
6,182,069 B1   1/2001 Niblack et al.
(Continued)

FOREIGN PATENT DOCUMENTS

CN    201467361 U    5/2010
CN    104424262 A    3/2015
(Continued)

OTHER PUBLICATIONS

International Search Report and Written Opinion for applciation PCT/US2017/016006, dated Mar. 30, 2017, 11 pages.
(Continued)

*Primary Examiner* — Baoquoc N To
(74) *Attorney, Agent, or Firm* — Cantor Colburn LLP

(57) ABSTRACT

A method for searching video includes receiving a video query, the video query including a first video query term identifying a first foreground object, a second video query term identifying a second foreground object, and a third video query term identifying a spatiotemporal relationship; searching the video in response to the video query for the first foreground object and the second foreground object within the spatiotemporal relationship; and generating a search result in response to the searching.

10 Claims, 3 Drawing Sheets

(51) Int. Cl.
*G06F 16/732* (2019.01)
*G06F 16/787* (2019.01)
*G06K 9/00* (2022.01)
*H04N 21/482* (2011.01)

(58) Field of Classification Search
USPC .................................................. 707/915
See application file for complete search history.

(56) References Cited

U.S. PATENT DOCUMENTS

| | | | |
|---|---|---|---|
| 6,446,060 B1* | 9/2002 | Bergman | G06F 16/58 |
| | | | 707/770 |
| 6,774,917 B1 | 8/2004 | Foote et al. | |
| 8,055,103 B2 | 11/2011 | Fu | |
| 8,422,794 B2 | 4/2013 | Ptucha | |
| 8,560,517 B2 | 10/2013 | Yang | |
| 8,589,410 B2 | 11/2013 | Sud | |
| 9,152,243 B2 | 10/2015 | Gu | |
| 9,165,070 B2 | 10/2015 | Barsook | |
| 9,202,137 B2 | 12/2015 | Bertelli | |
| 2006/0227992 A1 | 10/2006 | Rathus | |
| 2006/0251292 A1 | 11/2006 | Gokturk | |
| 2008/0002864 A1 | 1/2008 | Das | |
| 2008/0098316 A1 | 4/2008 | Declan | |
| 2009/0180690 A1 | 7/2009 | Fan | |
| 2014/0140630 A1 | 5/2014 | Hwang | |
| 2014/0250120 A1* | 9/2014 | Mei | G06F 16/5854 |
| | | | 707/736 |
| 2015/0063725 A1 | 3/2015 | Tai | |
| 2015/0170005 A1 | 6/2015 | Cohen | |
| 2015/0213058 A1 | 7/2015 | Ambardekar | |
| 2015/0261773 A1* | 9/2015 | Walid | G06F 16/951 |
| | | | 707/769 |

FOREIGN PATENT DOCUMENTS

| | | |
|---|---|---|
| WO | 0068881 A2 | 11/2000 |
| WO | 2015080371 A1 | 6/2015 |

OTHER PUBLICATIONS

Sivic et al., "Efficient Visual Search for Objects in Videos", Proceedings of the IEEE | vol. 96, No. 4, Apr. 2008, 19 pages.

Zhang, et al., "Search Web Images Using Objects, Backgrounds and Conditions", MM'12, Oct. 29-Nov. 2, 2012, Zhejiang University, China, 4 pages.

* cited by examiner

VIDEO SEARCHING USING MULTIPLE QUERY TERMS

TECHNICAL FIELD

The subject matter disclosed herein relates generally to video searching, and more particularly, to video searching using multiple query terms.

BACKGROUND

Existing video searching systems may use a query-by-example format. Query-by-example systems are based on presenting an example about the class of videos (or visual media in general) the user wants to retrieve. However, there are limited capabilities of expressing composite queries. There is no convenient, efficient, effective way, for example, of specifying several objects (e.g., person, dog, etc.) that need to appear in the query video at the same or at different times, and surrounded by some desired background (e.g., the interior of an airport).

BRIEF DESCRIPTION

According to one embodiment, a method for searching video includes receiving a video query, the video query including a first video query term identifying a first foreground object, a second video query term identifying a second foreground object, and a third video query term identifying a spatiotemporal relationship; searching the video in response to the video query for the first foreground object and the second foreground object within the spatiotemporal relationship; and generating a search result in response to the searching In addition to one or more of the features described above, or as an alternative, further embodiments may include wherein the video query includes a fourth video query term identifying a background; wherein the searching includes searching the video in response to the video query for the first foreground object and the second foreground object within the spatiotemporal relationship and within the background.

In addition to one or more of the features described above, or as an alternative, further embodiments may include wherein the spatiotemporal relationship includes at least one Boolean operator.

In addition to one or more of the features described above, or as an alternative, further embodiments may include wherein the spatiotemporal relationship includes at least one Interval operator.

In addition to one or more of the features described above, or as an alternative, further embodiments may include wherein the first foreground object in the first video query term is identified by an image.

In addition to one or more of the features described above, or as an alternative, further embodiments may include wherein the first foreground object in the first video query term is identified by text.

In addition to one or more of the features described above, or as an alternative, further embodiments may include wherein the background in the fourth video query term is identified by an image.

In addition to one or more of the features described above, or as an alternative, further embodiments may include wherein the background in the fourth video query term is identified by text.

In addition to one or more of the features described above, or as an alternative, further embodiments may include wherein the search result identifies a portion of a video meeting the video query.

According to another embodiment, a search engine includes a processor; and a memory comprising computer-executable instructions that, when executed by the processor, cause the processor to perform operations, the operations comprising: receiving a video query, the video query including a first video query term identifying a first foreground object, a second video query term identifying a second foreground object, and a third video query term identifying a spatiotemporal relationship; searching the video in response to the video query for the first foreground object and the second foreground object within the spatiotemporal relationship; and generating a search result in response to the searching.

According to another embodiment, a computer program product tangibly embodied on a computer readable medium, the computer program product including instructions that, when executed by a processor, cause the processor to perform operations comprising: receiving a video query, the video query including a first video query term identifying a first foreground object, a second video query term identifying a second foreground, and a third video query term identifying a spatiotemporal relationship; searching the video in response to the video query for the first foreground object and the second foreground object within the spatiotemporal relationship; and generating a search result in response to the searching.

Technical effects of embodiments include the ability to search video for specified foreground objects in a specified background, satisfying a spatiotemporal relationship.

BRIEF DESCRIPTION OF THE DRAWINGS

The foregoing and other features, and advantages of embodiments are apparent from the following detailed description taken in conjunction with the accompanying drawings in which.

DETAILED DESCRIPTION

Figure 1:
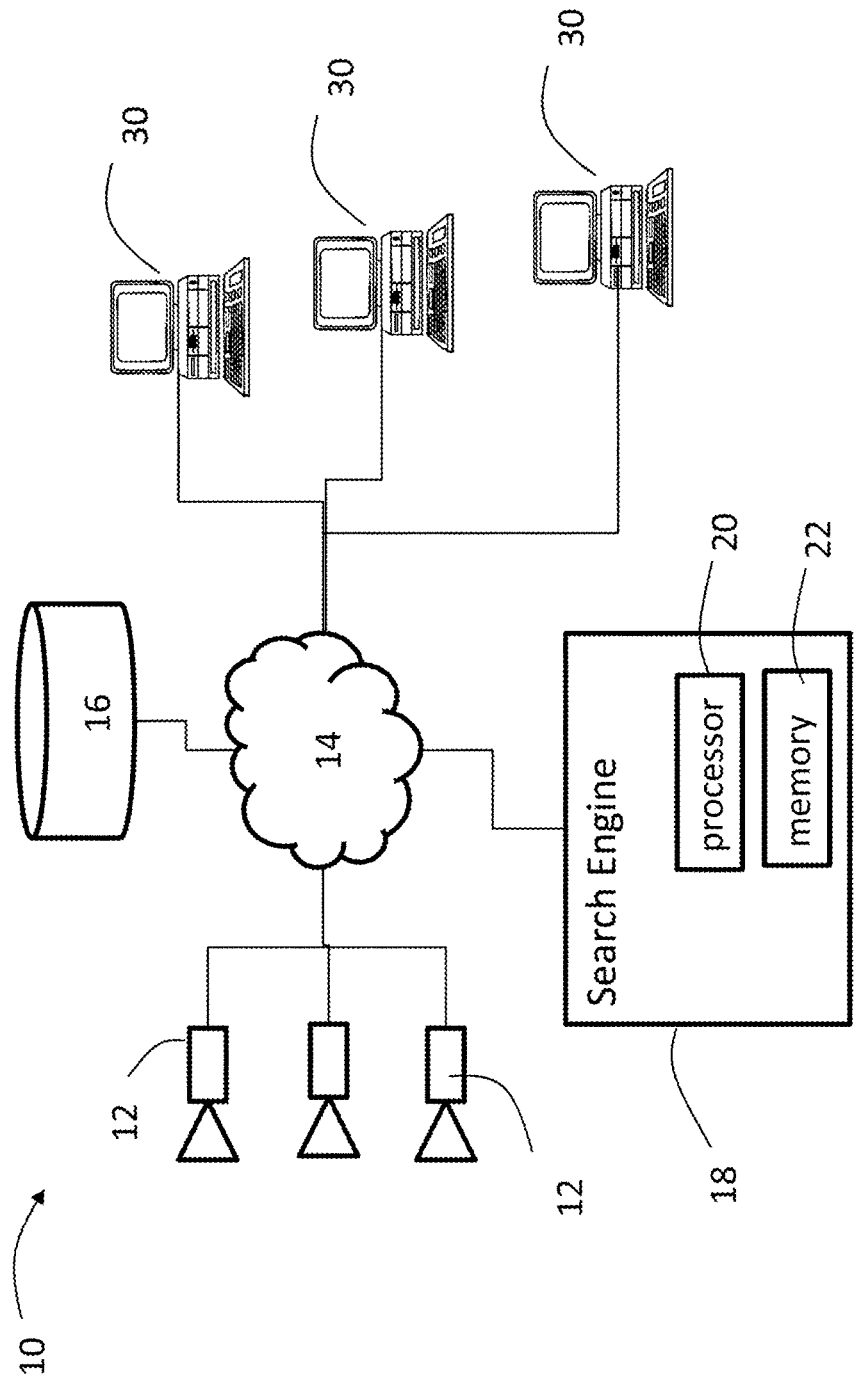
FIG. 1 depicts a system for searching video in an exemplary embodiment.

FIG. 1 illustrates a system 10 for searching video in an exemplary embodiment. Video should be understood to comprise one or more frames, where each frame is an image, and may be stored in a compressed or uncompressed format. The system 10 includes at least one video source 12. In an exemplary embodiment, the video source 12 is a camera that generates video (e.g., a security camera). In other embodiments, the video source 12 may be storage device that contains already recorded video.

The video source 12 is coupled to a network 14. The network 14 may be any type of known network including, but not limited to, a wide area network (WAN), a local area network (LAN), a global network (e.g. Internet), a virtual private network (VPN), and an intranet, and combinations of multiple network types. The network 14 may be implemented, in whole or in part, using wireless networks or any kind of physical network implementation known in the art, e.g., using cellular, satellite, and/or terrestrial network technologies. The network 14 may also include short range wireless networks utilizing, e.g., BLUETOOTH™ and WI-FI™ technologies and protocols.

A storage device 16 is coupled to the network 14 for storing video from the video source 12. The storage device 16 may be implemented using a variety of devices for storing electronic information. It is understood that the storage device 16 may implemented using memory contained in a search engine 18 or it may be a separate physical device, as illustrated in FIG. 1. The storage device 16 may be logically addressable as a consolidated data source across a distributed environment that includes one or more networks, such as the network 14. Information stored in the storage device 16 is retrieved and manipulated via the search engine 18.

One or more user devices 30 may communicate with the search engine 18 over network 14. The user devices 30 may be processor based devices, such as personal computers, tablets, PDAs, mobile devices (e.g., smart phones), etc. The user devices 30 may interface with the search engine 18 via a user interface supported in whole or in part on the search engine 18 and/or in whole or in part on user device 30.

The search engine 18 executes a video query application that receives video queries, e.g., from a user device 30, and searches video on the storage device 16 for video matching the query. Generally, in terms of hardware architecture, the search engine 18 may include one or more processors 20 and a computer readable storage memory 22. The search engine 18 may be implemented using existing processing devices such as personal computers, servers, or cloud computing facilities. The search engine 18 interfaces with network 14 via one or more input and/or output (I/O) devices (not shown). The processor 20 is a hardware device for executing software that can be stored in the memory 22. The processor 20 can be virtually any custom made or commercially available processor, a central processing unit (CPU), a data signal processor (DSP), or an auxiliary processor among several processors associated with the search engine 18, and the processor 20 may be a semiconductor based microprocessor (in the form of a microchip) or a microprocessor. The computer readable memory 22 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 22 may incorporate electronic, magnetic, optical, and/or other types of storage media. Note that the memory 22 can have a distributed architecture, where various components are situated remote from one another, but can be accessed by the processor 20.

The processor 20 executes a video query application that can be stored on virtually any computer readable storage medium for use by or in connection with any computer related system or method. The video query application can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In operation, a user device 30 accesses the search engine 18 via network 14 and submits a video query to locate one or more videos in the storage device 16 that meet the video query. Embodiments allow the user device 30 to submit a video query having a plurality of video query terms. This allows the user device 30 to define multiple conditions that must be met in order to deem a video a match. The video query terms may include one or more foreground objects, one or more background objects or areas, and spatiotemporal relationships between the one or more foreground and background objects or areas. A spatiotemporal relationship need not be simultaneously spatial and temporal; rather it may be purely spatial or purely temporal. In an alternative embodiment the spatiotemporal relationships may apply equally to and between foreground objects and background objects or areas. The search engine 18 applies the multiple video query terms to videos in the storage device 16 to determine a search result (i.e., an indication if any videos in the storage device meet the video query).

Figure 2:
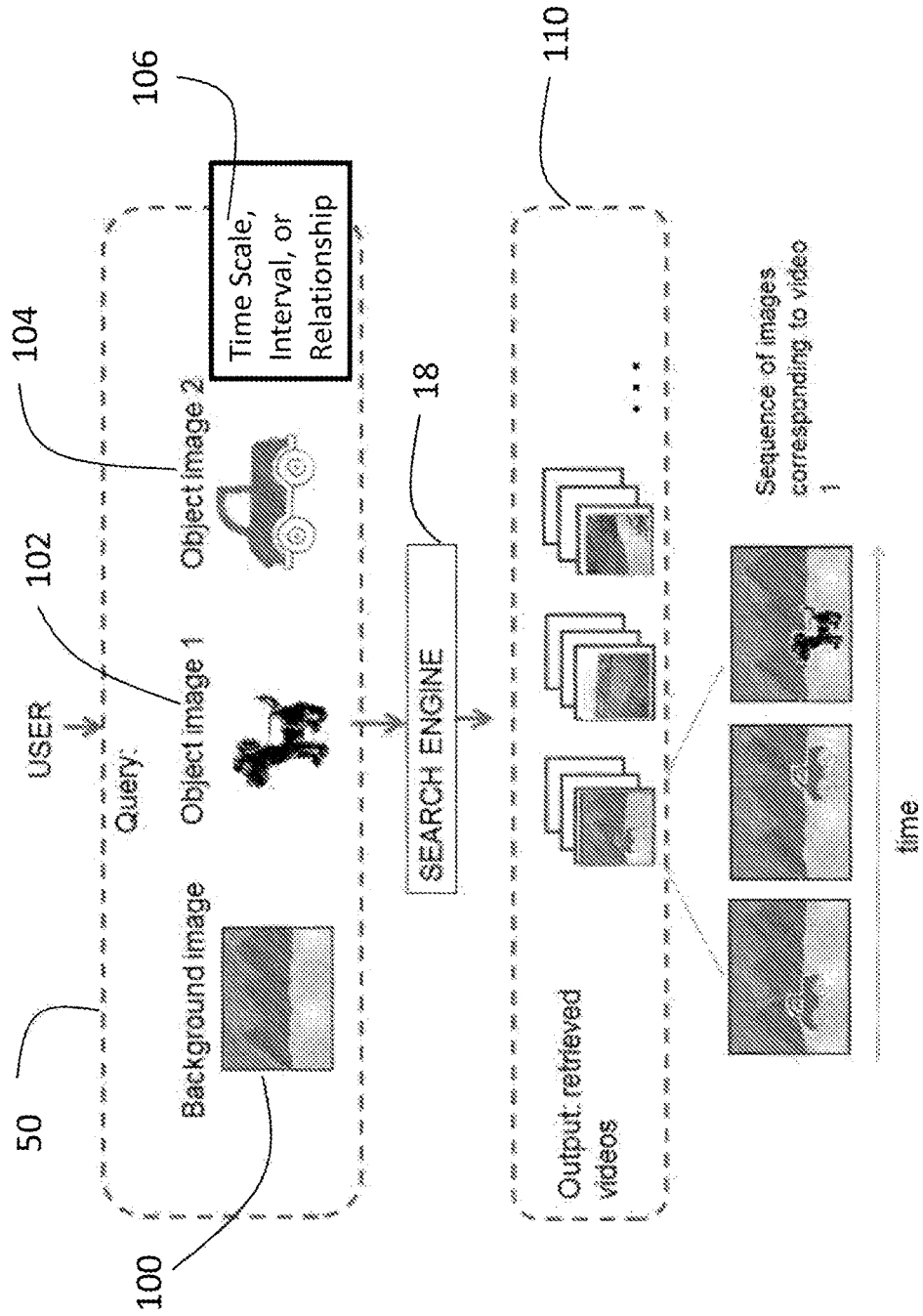
FIG. 2 depicts processing a video query in an exemplary embodiment.

FIG. 2 depicts a video query 50 and search result in an exemplary embodiment. In the example shown in FIG. 2, the user device 30 generates a video query 50 that includes four video query terms. It is understood that the video query 50 may include any number of video query terms. A first video query term is a background 100. A second video query term is a foreground object 102. A third video query term is a foreground object 104. A fourth video query term is a time scale, interval, or relationship 106, referred to as a spatiotemporal relationship. The spatiotemporal relationship may include a Boolean operator and/or an interval operator between multiple spatiotemporal conditions. In the example of FIG. 2, the video query is a request to locate foreground object 102 and foreground object 104, in the relevant background 100, within a certain time of each other defined by the time scale, interval, or relationship 106. The example of FIG. 2 is a Boolean AND operation, but other Boolean operations (such as OR, NOT), may be used to combine the video query terms. Similarly, other time scales, intervals, or relationships (e.g., operators such as precedes, meets, overlaps, finished by, contains, starts, equals, started by, during, finishes, overlapped by, met by, preceded by, their compositions, etc.) may be used to combine video query terms. Equally, other spatial relationships can be expressed by the cardinal direction calculus and the region connection calculus may be used to combine video query terms. Any of these ways of expressing spatiotemporal relationships may be quantified in absolute terms or may be in relative terms.

The video query terms in FIG. 2 may be submitted in a variety of formats. The foreground object and/or the background video query terms may be defined using images (e.g., pictures, sketches). For example, the video query may include a picture of a person (i.e., foreground object) and a picture of an airport gate (i.e., background). The search engine 18 would locate videos where this person is at the airport gate. The foreground object(s) and/or background video query terms may also be identified by textual descriptors, such as a name of a person or an object serving as the foreground object, and a name of the background. For example, a textual video query may include ALDRIN and MOON to locate video of Buzz Aldrin on the moon. When the video query terms are textual, the search engine 18 may convert the textual query terms to images for matching with the video(s) in the storage device 16.

Referring back to FIG. 2, the search engine 18 receives the video query 50 and locates video(s) in the storage device 16 that meet the video query 50. In the example of FIG. 2, the search engine 18 locates a video having the background 100 and the foreground objects 102 and 104 present in the video within the time scale, interval, or relationship 106. The time scale, interval, or relationship 106 may define a time period within which the foreground objects 102 and 104 need to be present. For example, the search engine 18 may locate videos in which foreground object 102 and foreground object 104 are present within 5 minutes of each other. The time scale, interval, or relationship 106 aids in locating relevant videos, as often the goal of the search is to locate two or more foreground objects at a particular place (i.e., a background) within a certain time period.

The search engine 18 generates a search result 110 including, for example, videos, excerpts of the videos, abstractions of the videos, or links to the videos stored in the storage device 16 matching the video query 50. The search engine 18 may use a variety of techniques to determine a match between the video query and the videos in the storage device 16. Time periods within the video may be determined from time encoding in the video itself, and is evaluated to ensure that the temporal relationship video query term is met. The foreground objects and background may be located in the videos stored in the storage device 16 using existing pattern matching techniques. As known in the art, matching does not require a 100% match between a video query term and elements in the video. As used herein, matching refers to the pattern matching technique indicating a sufficient degree of similarity between the video query term and the video.

Figure 3:
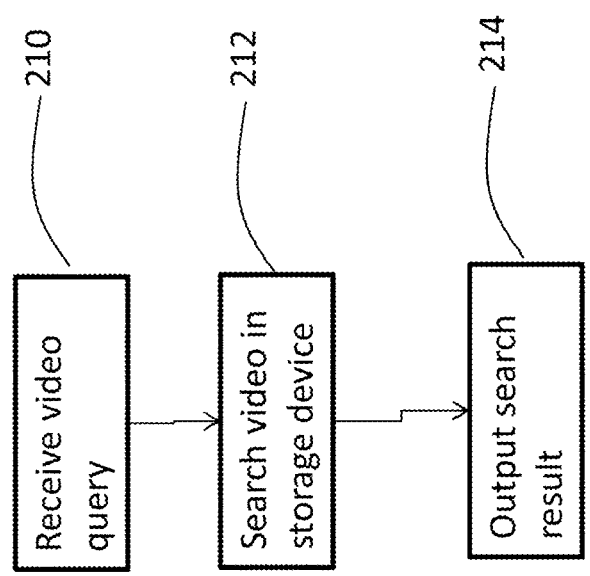
FIG. 3 depicts a flow chart for searching video in an exemplary embodiment.

FIG. 3 depicts a flow chart of operations performed by the search engine 18 in an exemplary embodiment. At 210, the search engine 18 receives the video query. The video query may be received from a user device 30 or may be a regularly executed video query that is stored on the search engine 18 and executed periodically. As noted above, the video query may contain video query terms including a background, one or more foreground objects and a spatiotemporal relationship. The video query may also include Boolean operators, such as AND, OR and NOT. At 212, the search engine 18 searches videos on storage device 16 to locate videos meeting the video query. At 214, the search engine 18 generates a search result. The search engine 18 may provide a link to each video in storage device 16 that meets the video query (i.e., the video satisfies the video query terms of the video query). The search engine 18 may also provide in the search result an indication of what time period in the video meets the temporal relationship from the video query. Alternatively, the search engine 18 may parse the search results to provide just the portions of the videos meeting the video query terms, including the time scale, interval, or relationship.

Embodiments allow for expressing a video query in a way that is helpful in surveillance applications. For example, consider that a user wants to visualize any video tracks of a desired airport where a desired person drops a specific suspicious bag. To express this query, the user can take a picture of an interior part of the airport where the action (dropping a bag) is supposed to happen. Then the user gets an independent photo of the person that they want to localize and a photo of the bag, and introduces the three photos in a video query to the search engine 18.

As described above, the exemplary embodiments can be in the form of processor-implemented processes and devices for practicing those processes, such as search engine 18. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the exemplary embodiments. When implemented on a general-purpose microprocessor, the computer program code segments configure the microprocessor to create specific logic circuits.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

The invention claimed is:

1. A method for searching video, the method comprising:
receiving a video query, the video query including a first video query term identifying a first foreground object, a second video query term identifying a second foreground object, and a third video query term identifying a spatiotemporal relationship between the first foreground object and the second foreground object;
searching the video in response to the video query for the first foreground object and the second foreground object within the spatiotemporal relationship; and
generating a search result in response to the searching;
wherein the spatiotemporal relationship is a time scale, a time interval or a time relationship;
wherein the video query includes a fourth video query term identifying a background;
wherein the searching includes searching the video in response to the video query for the first foreground object and the second foreground object within the spatiotemporal relationship and within the background.

2. The method of claim 1 wherein:
the spatiotemporal relationship includes at least one Boolean operator.

3. The method of claim 1 wherein:
the spatiotemporal relationship includes at least one Interval operator.

4. The method of claim 1 wherein:
the first foreground object in the first video query term is identified by an image.

5. The method of claim 1 wherein:
the first foreground object in the first video query term is identified by text.

6. The method of claim 1 wherein:
the background in the fourth video query term is identified by an image.

7. The method of claim 1 wherein:
the background in the fourth video query term is identified by text.

8. The method of claim 1 wherein:

the search result identifies a portion of a video meeting the video query.

9. A search engine comprising:

a processor; and a memory comprising computer-executable instructions that, when executed by the processor, cause the processor to perform operations, the operations comprising:

receiving a video query, the video query including a first video query term identifying a first foreground object, a second video query term identifying a second foreground object, and a third video query term identifying a spatiotemporal relationship between the first foreground object and the second foreground object;

searching the video in response to the video query for the first foreground object and the second foreground object within the spatiotemporal relationship; and generating a search result in response to the searching;

wherein the spatiotemporal relationship is a time scale, a time interval or a time relationship;

wherein the video query includes a fourth video query term identifying a background;

wherein the searching includes searching the video in response to the video query for the first foreground object and the second foreground object within the spatiotemporal relationship and within the background.

10. A computer program product tangibly embodied on a computer readable medium, the computer program product including instructions that, when executed by a processor, cause the processor to perform operations comprising:

receiving a video query, the video query including a first video query term identifying a first foreground object, a second video query term identifying a second foreground, and a third video query term identifying a spatiotemporal relationship between the first foreground object and the second foreground object;

searching the video in response to the video query for the first foreground object and the second foreground object within the spatiotemporal relationship; and generating a search result in response to the searching;

wherein the spatiotemporal relationship is a time scale, a time interval or a time relationship;

wherein the video query includes a fourth video query term identifying a background;

wherein the searching includes searching the video in response to the video query for the first foreground object and the second foreground object within the spatiotemporal relationship and within the background.

* * * * *